United States Patent [19]
Maeda

[11] Patent Number: 5,260,930
[45] Date of Patent: Nov. 9, 1993

[54] OPTICAL INFORMATION RECORDING MEDIUM AND REPRODUCING APPARATUS FOR REPRODUCING INFORMATION FROM THE MEDIUM

[75] Inventor: Takanori Maeda, Saitama, Japan

[73] Assignee: Pioneer Electronic Corporation, Tokyo, Japan

[21] Appl. No.: 879,349

[22] Filed: May 7, 1992

[30] Foreign Application Priority Data

Jul. 19, 1991 [JP] Japan .................. 3-179374

[51] Int. Cl.$^5$ .............................. G11B 7/00
[52] U.S. Cl. .................. 369/275.3; 369/275.1; 369/275.4
[58] Field of Search .............. 369/275.3, 275.1, 100, 369/124, 44.37, 275.3, 275.4, 109, 112, 120, 121

[56] References Cited

U.S. PATENT DOCUMENTS

| | | | |
|---|---|---|---|
| 3,931,460 | 1/1976 | Watson | 369/275.3 |
| 4,067,044 | 1/1978 | Maeda et al. | 358/128 |
| 5,031,166 | 7/1991 | Getreuer et al. | 369/275.3 |

FOREIGN PATENT DOCUMENTS

| | | |
|---|---|---|
| 0301865 | 2/1989 | European Pat. Off. . |
| 59-92445 | 5/1984 | Japan . |
| 2172020 | 7/1990 | Japan . |

*Primary Examiner*—Paul M. Dzierzynski
*Assistant Examiner*—Kiet T. Nguyen
*Attorney, Agent, or Firm*—Sughrue, Mion, Zinn, Macpeak & Seas

[57] ABSTRACT

A recording medium has a flat surface on which information is optically recorded. The recording medium rotates about a rotational axis normal to the flat surface. The recording medium has a first track extending around the rotational axis and a second track extending around the rotational axis along the first track. The second track has a plurality of segments, each of which being connected to adjacent segments and having a longitudinal direction different from the adjacent segments such that the second track extends in a zigzag fashion along the first track. The longitudinal direction the respective segments are oriented substantially toward the first track.

8 Claims, 3 Drawing Sheets

OPTICAL INFORMATION RECORDING MEDIUM AND REPRODUCING APPARATUS FOR REPRODUCING INFORMATION FROM THE MEDIUM

BACKGROUND OF THE INVENTION

1. Field of the Invention

The present invention relates to an optical information reproducing apparatus and an optical recording medium on which information such as image information is optically recorded. The present invention particularly relates to a recording medium capable of recording wideband signal such as high definition television signal, and to an apparatus for reproducing information from such record media.

2. Prior Art

Optical disks are formed therein with elongated circular pits arranged in a spiral around the center of the disk so that information is represented in terms of the presence and absence of pits. For example, an image signal and an audio signal are modulated onto an FM carrier frequency. The frequency-modulated signal is then supplied to an optical modulator which in turn outputs a modulated light. The output light of optical modulator is exposed to the surface of the optical disk to form pits therein in accordance with the image and audio information. In this manner, information is recorded onto the optical disk.

Optical video disk systems include CAV(constant angular velocity) system where an optical disk rotates at a constant angular velocity, and CLV(constant linear velocity) system where the length of a track traced by a light beams per unit time is constant. In the CAV system, the disk rotates at a speed of 1800 r.p.m. and one rotation makes one frame of picture. Since the sync signals are radially aligned in the CAV system, the CAV system is suitable for trick plays such as still pictures, slow motion pictures, and reduced shots. Meanwhile, the disk is rotated at a constant speed of about 11 m/s in the CLV system. The disk rotates at 1800 r.p.m. while information is read from the tracks closest to the center of disk. The rotational speed is gradually decreased as the information is read from the tracks far from the center of disk, reaching about 600 r.p.m. when the information is read from the outermost track. The innermost track is capable of recording one picture frame while the outermost track three frames. Thus, the CLV system is capable of recording information of twice as long time as the CAV.

In order to record and reproduce a high definition television signal such as Hi-Vision signal, a large amount of information needs to be recorded on an optical disk and it is therefore necessary to read a larger amount of information from the disk per unit time. That is, the optical disk must be capable of recording information over a wide frequency band. For implementing a wideband disk, smaller pits may be effective to increase the number of pits per unit length of track, so that more number of pits are read per unit time to reproduce information over a wide frequency band. In this, case, the minimum length of pits must be shorter than that of conventional disks. For good resolution of pits having such short pit lengths, a pickup must have a wide spatial frequency band. For the wide spatial frequency of pickup, it is necessary to use a light source having a shorter wavelength or to increase numeric aperture of an objective. Light sources having shorter wavelengths may be implemented by using gas lasers and other lasers that utilize non-linear optical elements in place of the conventional semiconductor lasers. However, this leads to large sizes of apparatus and increased costs. Larger numeric apertures of objective tend to cause errors in reproducing signals due to the uneven surface and tilt of the disk. Thus, the disk must have very uniform surface.

Another way of implementing wideband frequency characteristics of an optical disk may be to employ higher rotational speeds of disk. However, higher rotational speeds of disk require larger motors. Moreover, it is difficult to maintain accurate focusing of a light beam on the disk surface due to the tilt of disk and inclined rotational axis of disk drive. It is extremely difficult to accurately control the focusing of the light beam exposed on the disk surface at increased rotational speeds of disk.

Still another way of implementing wideband frequency characteristics of optical disk is to divide a wideband signal into a plurality of portions and to record them onto a plurality of tracks, respectively. Then, the recorded information is simultaneously read from the plurality of tracks, thereby implementing wideband frequency characteristics of a disk. However, in order to read the information from a plurality of tracks by means of a single pickup, the disk must be uniform over a large surface area. In addition, a plurality of light beams are needed to read information. For simple construction of a light source, a single light beam may be split into a plurality of beams. In this case, the respective beam may not have sufficient intensity to provide good signal-to-noise ratio.

SUMMARY OF THE INVENTION

An object of the present invention is to provide an optical information recording medium which provides greatly improved wide frequency band characteristics of optical information. Another object of the invention is to provide a reproducing apparatus which reads information from such optical information record media.

A recording medium has a flat surface on which information is optically recorded. The recording medium rotates about a rotational axis normal to the flat surface. The recording medium has a first track extending around the rotational axis and a second track extending around the rotational axis along the first track. The second track has a plurality of segments, each of which being connected to adjacent segments and having a longitudinal direction different from the adjacent segments such that the second track extends in a zigzag fashion. The longitudinal directions of the respective segments are oriented substantially toward the first track.

BRIEF DESCRIPTION OF THE DRAWINGS

Features and other objects of the invention will be more apparent from the description of the preferred embodiments with reference to the accompanying drawings in which.

DETAILED DESCRIPTION OF THE PREFERRED EMBODIMENTS

Figure 1:
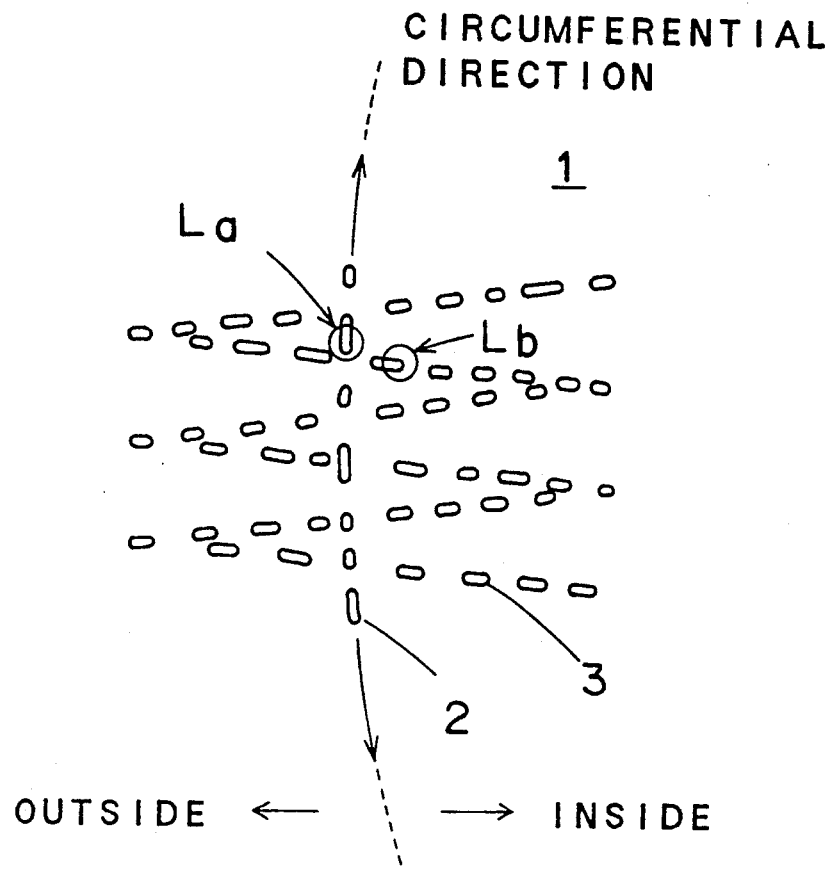
FIG. 1 shows an embodiment of an optical information recording medium according to the present invention.

FIG. 1 shows pits on a part of a track formed on an optical disk according to the present invention.

A first track is a program track 2 or guide groove which is arranged in a spiral fashion around the center of optical disk. A second track 3 is a track by which information is represented in terms of pits. The second track 3 crosses transversely of the first track and advances in a zigzag fashion as shown longitudinally of the first track 2. By arranging the second track 3 in this manner, the length of the second track 3 per unit rotation of the disk may be effectively increased. This increases the amount of information per unit time both in recording and in reproducing without increasing the rotational speed of disk, thereby implementing wideband frequency characteristics of optical disk. The information recorded in the respective tracks is represented in terms of the depth of pits. A photosensitive resist is applied to the surface of the master disk and is then exposed to an light carrying information. Information may be recorded on phase change type disks, dye worm disks, or optical magnetic type-disks by means of a later described pickup. The information on the disk may also be recorded in terms of changes in reflectivity or changes in polarization in stead of being recorded in terms of depths of pits. Address information representing the addresses of each piece of information may be recorded on the track 2 for ease of retrieval of information.

A pickup is a device that condenses the laser beam from a semiconductor laser to expose the laser beam onto a target surface of an optical disk to record information, and which receives the light reflected from the pits to convert the reflected light into an electrical signal. The pickup includes an optical paths and a drive system for driving the light through the paths.

Figure 2:
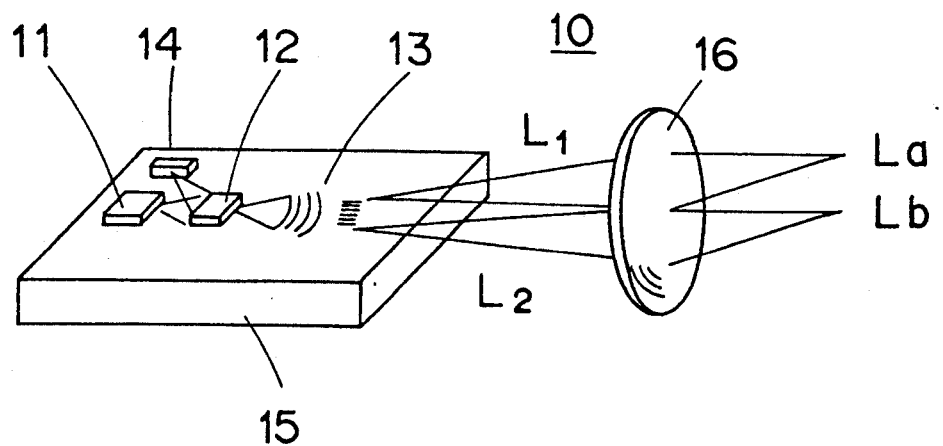
FIG. 2 shows an embodiment of an optical information reproducing apparatus according to the present invention.

FIG. 2 shows an embodiment of a pickup 10 as an optical information reproducing apparatus according to the present invention. The SAW device 13 may be replaced by other devices such as roof-shaped prisms, mirrors, and diffraction gratings, all of which vibrating or rotating. Devices such as photoelectric control devices and optical magnetic control devices may also be used. A photodetector 14 receives the light reflected from the optical disk to perform focus control as well as tracking control of the light exposed to the surface of disk. The above mentioned elements 10–14 are arranged on a substrate 15. An objective 16 forms an image on the surface of optical disk 1 while also condensing a scattered and diffracted light.

The operation of the pickup 10 will now be described.

The light beam from the semiconductor laser 11 goes through the beam splitter 12 into the SAW device 13 where the light beam is split into a transmitted light L1 and a diffracted light L2. The beam splitter 12 permits the light from the light source 11 to go therethrough while also directing the light from the optical disk 1 to the light detector 14. The two light beams L1 and L2 go through the objective 16 and are exposed as light spots La and Lb onto the optical disk 1. The transmitted light L1 is a light beam that is not changed its orientation when the SAW device 13 is modulated by a high frequency current. Meanwhile, the diffracted light L2 is a light beam that is deflected to left and right along the surface of the SAW device 13 as shown in FIG. 2 when the SAW device 13 is modulated by a high frequency current.

When the optical disk 1 is rotated, the pickup 10 moves relative to the optical disk 1 along the first track 2.

Figure 3A:
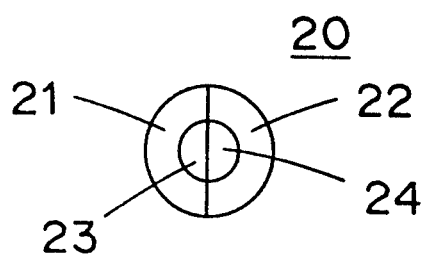
FIGS. 3A and 3B show the general construction of the light detector in FIG. 2.
Figure 3B:
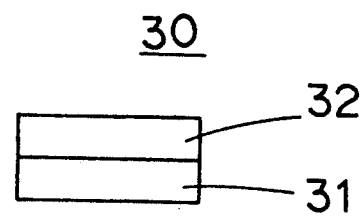
Figure 6:
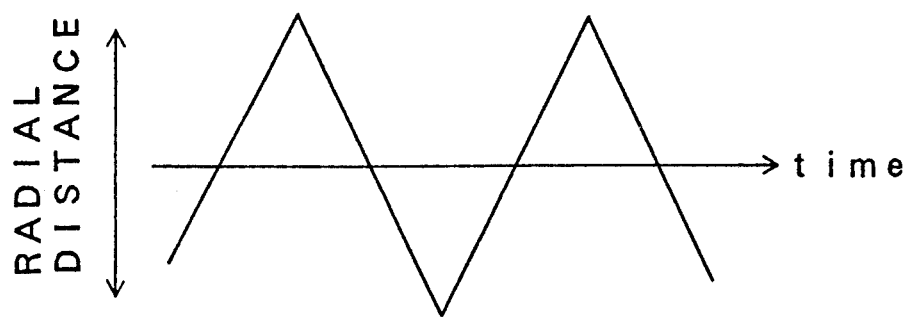
FIG. 6 shows a function with which the light spot Lb is scanned when the disk rotates at a constant linear velocity.

Thus, the transmitted light L1(light spot La) is scanned along the track 2 to read the information recorded on the track 2. Likewise, the diffracted light L2(light spot Lb) scans the second track 3 to read the information recorded on the track 3. The light spot Lb is scanned with a function of triangular waveform with respect to time as shown in FIG. 6 when the disk is rotated at a constant linear velocity. The lights beams scattered and diffracted by the tracks 2 and 3 are reflected back to the objective 16 and are again condensed by the objective 16, and are then directed by the beam splitter 12 into the light detector 14. The light detector 14 is formed of two light detecting elements 20 in FIGS. 3A and 30 in FIG. 3B. The light detecting element 20 serves to detect the focal positions of the transmitted light L1 and diffracted light L2 and to control the radial position of transmitted light L1 on the optical disk 1. The light detecting element 20 includes two halves 21 and 22 of an annular light sensor. The outer radus of the annular light sensor is selected such that the halves each receives half of the total amount of light incident upon the light detecting element 20 when the light spot La is condensed on the optical disk 1. Taking the difference between the outputs of sensors 21-22 and the outputs of sensors 23-24 permits detection of focal depth on the surface of optical disk 1. Other focal depth detecting methods include knife edge method, astigmatism method, and wedge prism method. The detected focal depth can be used to apply focusing servo to the beam, so that the position of disk relative to the light beam exposed thereupon is accurate within a focal depth of the light beam. If the disk is manufactured to be accurate to within focal depth, then the aforementioned servo mechanism is not needed. Tracking detection may also be effected by time difference method, three-beam method based on a multitude of light spots. Taking the difference between the outputs of light sensors 21 and 23 and the outputs of light sensors 22 and 24 permits tracking control based on the push-pull method which enables proper tracing of track 2 of the transmitted light 11(light spot La).

The photodetector 30 is formed of two belt-like light sensors 31 and 32 and receives the diffracted light L2. The boundary between the sensors 31 and 32 is where the diffracted light L2 is divided into two equal parts. The difference between the sensors 31 and 32 can be used to determine the deviation of the diffracted light L2 from the track 3 through the use of push-pull method. A signal indicative of the deviation is used to control the diffracted light L2 scanned along the track 3 such that the diffracted light L2 closely traces the track 3. The entire light L1 and L2 are used to read the information recorded on the disk 1.

Figure 4:
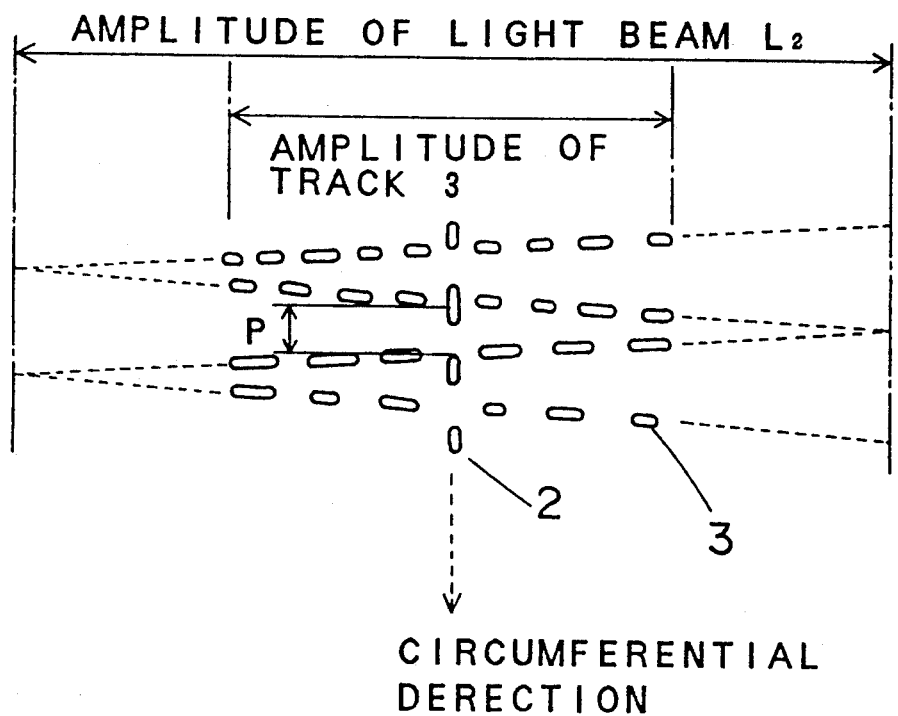
FIG. 4 shows another embodiment of an optical information recording medium.

The frequency at which the light beam L2 traces the track 3 is given as follows:

$$\frac{(2\pi \times 12 \times 10)}{(0.0016 \times 2)} = 235{,}620 \text{ Hz}$$

where the rotational speed of disk 1 is ten per second, the radius of the track 2 is 12 mm, and the pitch P of track 3 along the track 2 as shown in FIG. 4 is 1.6 μm.

This indicates that the light beams L2 (light spot Lb) needs to be scanned the track 3 at a frequency of about 230 kHz. The linear velocity at this time is given as follows:

$$235{,}620 \times 0.00005 \times 2 \approx 23.56 \text{ m/s}$$

assuming that the scan width is 50 μm.

In contrast to this, the linear velocity for scanning the conventional spiral track is given as follows:

$$2\pi \times 0.012 \times 10 = 0.75 \text{ m/s.}$$

Thus, the present invention provides a linear velocity of more than 30 times that of conventional disk for the same rotational speed, being advantageous in implementing greatly improved the wideband characteristics of optical disk.

Although the above embodiment has been described with respect to the light beam L2 that is scanned across the width of zigzag of the track 3, the light beam L2 may be driven to scan beyond the width but to read the data only on the track 3 is read as shown in FIG. 4.

Although, the segments of track 3 may be arranged to be exact right angles with respect to the track 2 and the light beam L2 is scanned in two dimensions. This two dimensional scanning technique is used in the Model LD-1000 laser disc player and VP-1000 manufactured by Pioneer Electronic Corp. The technique offers a reduced cross talk between the information recorded on the track 3 and that recorded on the track 2 when the information on track 2 is read.

Figure 5:
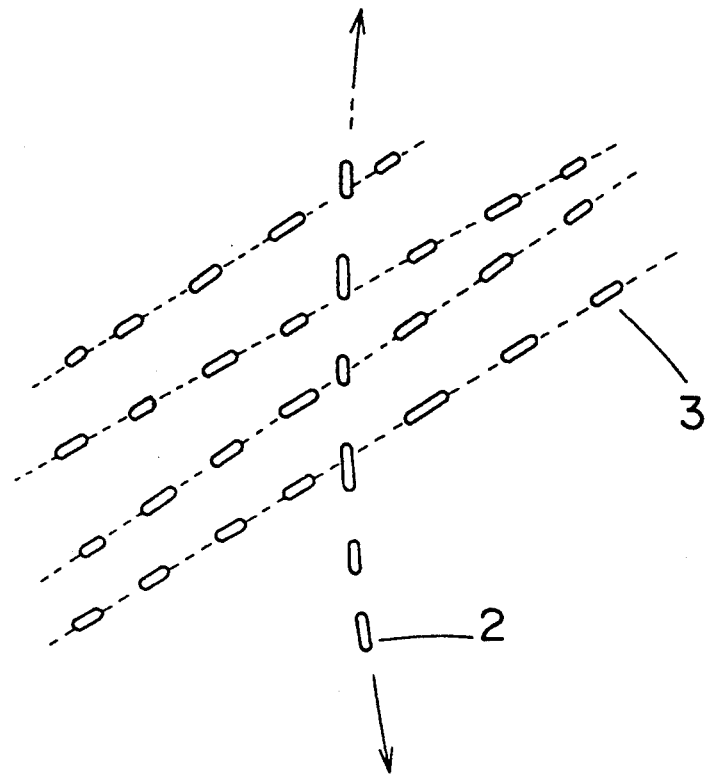
FIG. 5 shows still another embodiment of an optical information recording medium.

Although the above embodiment has been described with respect to the track 3 transverse to the track 2 at angles fairly close to right angles, the track 3 may be at an angle far from right angles with respect to the track 2 as shown in FIG. 5, being advantageous when the track 3 cannot be formed nearly at right angles with respect to the track 2 due to positional relation between the spindle motor and the pickup. In this case, the disk is rotated at a constant linear velocity and the light spot Lb is scanned with a function of triangular waveform with respect to time similar to that shown in FIG. 6. Thus, the light spot Lb has two different speeds relative to the disk surface depending on which direction the light spot Lb is scanning on the disk surface. Recording information on the track 3 shown in FIG. 5 needs a high power light source and reading information from the track 3 requires a wideband amplifier.

While the above embodiment has been described with respect to the light scanning means in the form of a dual axis SAW device, a single axis device may also be used by which the light is scanned obliquely.

What is claimed is:

1. A recording medium having a flat surface on which information is optically recorded and which rotates about a rotational axis normal thereto, comprising:
    a first track extending around the rotational axis; and
    a second track extending around the rotational axis along said first track, said second track having a plurality of segments, each of which being connected to adjacent segments and having a longitudinal direction different from the adjacent segments, said longitudinal direction being oriented substantially toward said first track.

2. A recording medium according to claim 1, wherein said first track is concentric with the rotational axis.

3. A recording medium according to claim 2, wherein said recording medium has more than one said first tracks, said second track being between two adjacent first tracks.

4. A recording medium according to claim 1, wherein each of said plurality of segments of said second track traverses said first track.

5. A recording medium according to claim 1, wherein said first track is of a spiral shape having a center thereof on the rotational axis.

6. A recording medium according to claim 5, wherein said second track is beside said first track.

7. A recording medium according to claim 1, wherein each of said plurality of segments of said second track traverses said first track.

8. A pickup apparatus for reading information from a recording medium having a flat surface on which information is optically recorded, said flat surface rotating about a rotational axis normal thereto and having a first track extending around the rotational axis and a second track extending around the rotational axis along said first track, said second track having a plurality of segments and each of said plurality of segments being connected to adjacent segments and having a longitudinal direction different from the adjacent segments, said longitudinal direction being oriented substantially toward said first track, wherein said pickup apparatus comprising:
    light scanning means for splitting a light from a light source into a first beam and a second beam, said light scanning means allowing said first beam to pass therethrough such that said first beam is exposed to said first track to scan said first track, said light scanning means driving said second beam such that said second beam is exposed to said second track to scan said second track; and
    light detecting means for detecting said first light and said second light reflected by said recording medium to thereby read information recorded on said recording medium.

* * * * *